United States Patent Office 3,422,245
Patented Jan. 14, 1969

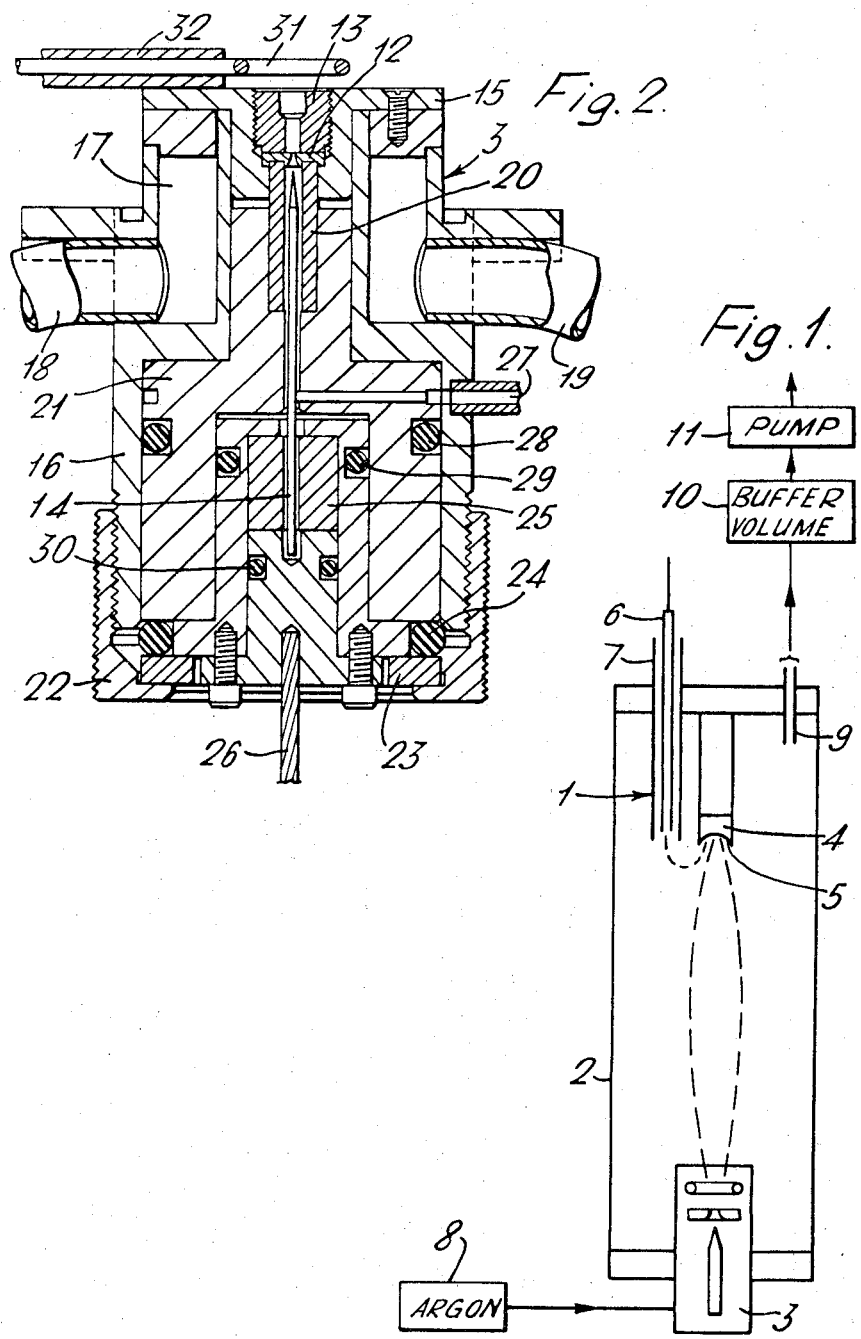

3,422,245
WELDING THERMOCOUPLES
Arthur Downs and Clive Maclean, Wantage, England, assignors to United Kingdom Atomic Energy Authority, London, England
Filed Oct. 27, 1966, Ser. No. 589,954
Claims priority, application Great Britain, Nov. 4, 1965, 46,871/65
U.S. Cl. 219—121                               8 Claims
Int. Cl. H05b 7/18

This invention relates to welding thermocouples, and in particular to the plasma arc welding of thermocouples of the kind comprising thermocouple wires surrounded by an electrically insulating refractory material in a tubular metal casing.

Such thermocouples are made from a thermocouple cable which is cut to the desired length and then welded in two stages. Firstly, the two thermocouple wires are welded to form the thermocouple junction, and then the casing is welded to form a sealed end enclosure. Previously proposed methods of doing this are disclosed in British patent specifications Nos. 998,066 and 1,051,146.

An object of the present invention is to provide an improved method of sealing the ends of such thermocouples.

According to one aspect of the present invention, a method of sealing the end of a thermocouple cable having a tubular metal casing surrounding thermocouple wires, comprises subjecting the casing to a plasma arc heating process, applying a potential to at least one of the thermocouple wires to cause an electric current to flow in a loop including said wire and the plasma, and stopping the heating process when said current ceases to flow.

Clearly the current ceases to flow when the loop is broken, and this happens when the heating process has caused the end of the casing to seal. The heating process therefore continues until the end of the thermocouple cable is sealed and is then automatically stopped. In this way a satisfactory seal is obtained, despite variations from cable to cable in the time for which the heating process has to be continued to form the seal.

According to another aspect of the present invention, apparatus for sealing the ends of thermocouple cables having tbular metal casings surrounding thermocouple wires comprises an enclosure wherein a thermocouple cable to be sealed is arranged to be mounted, means to maintain an inert atmosphere within the enclosure, a plasma generator mounted within the enclosure, means to control the plasma generator whereby the casing of said thermocouple cable is subjected to a plasma arc heating process, means to apply a potential to at least one of the thermocouple wires of said thermocouple cable to cause an electric current to flow in a loop including said wire and the plasma, means to sense the flow of said current, and means to stop the heating process when said current ceases to flow.

A method of welding thermocouples, the method being in accordance with the present invention, will now be described by way of example with reference to the accompanying drawings, in which:

FIGURE 1 shows diagrammatically the apparatus for performing the method,

FIGURE 2 shows a central cross section through a plasma generator which forms part of the apparatus of FIGURE 1.

Figure 3:
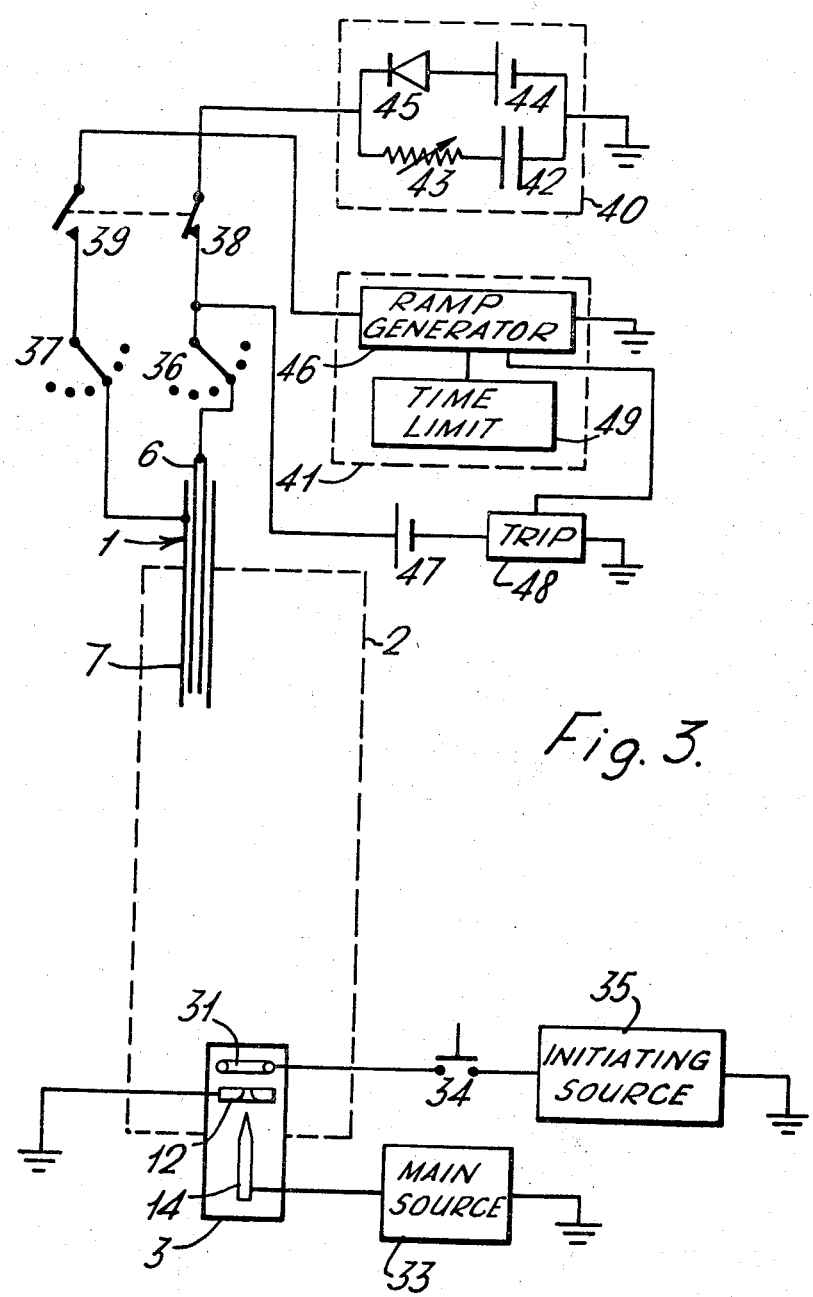
FIGURE 3 shows diagrammatically the main electrical parts of the apparatus of FIGURE 1.

The thermocouples are of the kind comprising two thermocouple wires surrounded by magnesium oxide in a tubular metal casing.

Briefly, the thermocouples are made from a thermocouple cable which is cut to the required length and then plasma arc welded in two stages. Firstly, the two thermocouple wires are welded to form the thermocouple junction, and the casing is welded to form a sealed end closure. The method will be described as applied to thermocouples of 1 mm. diameter, although clearly the method is applicable to other sizes.

Referring to FIGURE 1, the welding is performed by mounting a length of thermocouple cable 1 in a glass enclosure 2 and subjecting it to a plasma arc heating process. A plasma generator 3 supplies the plasma which is directed towards a steel deflector rod 4 having a concave end surface 5. The thermocouple wires 6 and the metal casing 7 of the cable 1 are selectively connected to a positive potential so as to attract free electrons and be welded by electron heating.

In practice six cables 1 are mounted in the enclosure 2 simultaneously, the cables 1 being symmetrically arranged round the rod 4. Welding is performed in an atmosphere of argon at a pressure of about 5 mm. mercury, argon from a supply 8 being admitted to the enclosure 2 via the plasma generator 3 and being exhausted via an outlet 9 at the other end of the enclosure 2. The outlet 9 is connected through a buffer volume 10 to a pump 11, the buffer volume 10 being roughly 20 times the volume of the enclosure 2. The buffer volume 10 prevents the pressure in the enclosure 2 fluctuating and improves the stability of the plasma.

Referring to FIGURE 2, the plasma generator 3 comprises an anode 12 in the form of a disc of silver 0.05 inch thick having a central hole 0.025 inch diameter, and a cathode 14 in the form of a rod of tungsten 0.06 inch diameter. The anode 12 is held in place by an anode clamp 13 which screws into an anode housing 15 which in turn is bolted to the main casing 16 of the plasma generator 3. In operation the main casing 16, and hence the anode 12, is earthed. The main casing 16 has in it water passages 17 through which cooling water is circulated via the inlet and outlet tubes 18 and 19.

Abutting the anode 12 is an alumina tube 20 which is recessed into a block 21 of insulating material retained in the main casing 16 by a cover 22, insulating washer 23 and O-ring 24. The cathode 14 is centrally disposed in the bore of the tube 20, and extends back through an aligned bore in the block 21 to a cathode holder 25 which is electrically connected to a cathode lead 26. Argon enters the plasma generator by way of an inlet 27, and further seals are provided by O-rings 28, 29 and 30.

Forward of the anode 12 is an initiating electrode 31 used for starting the plasma generator, the electrode 31 being held in an insulating holder 32.

Referring now to FIGURE 3, the anode 12 is, as stated above, earthed, and the cathode 14 is connected to a main source 33 which supplies a substantially constant current of some 10 amps at 15 volts. The initiating electrode 31 is connected via a switch 34 to an initiating source 35 which supplies some 350 milliamps at 1000 volts. To start the plasma generator 3, the main source 33 is first switched on and the switch 34 is then closed for about 10 seconds to start and establish plasma generation.

FIGURE 3 shows only one cable 1, the wires 6 of which are connected together and to a six terminal rotary switch 36, the other five terminals of which are connected to the wires 6 of the remaining five cables 1. The casing 7 is connected to one of the terminals of a six terminal rotary switch 37, the other five terminals of which are connected to the casings 7 of the remaining five cables 1. The switches 36 and 37 are connected via switches 38 and 39 respectively to a wire welding source 40, and a casing welding source 41, respectively. The switches 38 and 39 are linked so that when either one is open the other one is closed.

The source 40 comprises a capacitor 42 in series with a variable resistor 43, the value of which is set to compensate for varying values of resistance due to differing lengths of the cable 1. A parallel path comprises a source 44 in series with a diode 45, the purpose of this parallel path being to pre-heat the wires 6 to a temperature of about 1000° C. by passing a current of some 75 milliamps at 250 volts. After the preheatng, the capacitor 42, which has a value of 16 microfarads and is charged to 550 volts, is discharged through the wires 6 to form the thermocouple junction.

The casing welding source 41 comprises a ramp generator 46 which supplies a steadily rising current which starts at a value lower than that necessary for welding the casing 7.

Whilst the casing 7 is being welded there is also established a loop from a source 47 via the wires 6 and the plasma to the anode 12 and hence to earth. So long as the end of the casing 7 is open, this loop is maintained and a current of about 1 milliamp flows around it. However, as the current supplied by the generator 46 increases, welding of the casing 7 will take place, and when the end of the casing 7 closes the loop will be broken. When this occurs a trip 48 cuts off the generator 46. In addition there is a time limit device 49 which will cut off the generator 46 after a predetermined time if the trip 48 fails to do so. This is necessary in order to stop operation on a faulty cable 1.

The sequence of operation is therefore as follows, reference first being made to FIGURE 1.

Six cables 1 are prepared by lightly filing flat the end of each, drilling out the wire 6 and magnesium oxide to a depth of 1 mm., and removing the magnesium oxide to a further depth of 0.5 mm. The ends of the wires 6 are then bent over towards one another. The six cables 1 are mounted in the enclosure 2 and with the argon source 8 on the pressure in the enclosure 2 is reduced to about 5 mm. mercury.

Referring now to FIGURE 3, the plasma generator 3 is started and when plasma generation has been established the source 44 is arranged to supply a total current of about 270 milliamps to all six pairs of wires 6 in parallel to about 1 minute as a preparatory cleaning and purging operation. The switch 38 is then closed, and switch 36 set to select the first pairs of wires 6. After preheating by the source 44, the capacitor 42 is discharged to cause welding of the thermocouple junction, the preheating current being maintained during the discharge. This is then repeated for the other five cables 1.

Switch 39 is then closed and the switch 37 set to select the first casing 7. The ramp generator 46 supplies a steadily increasing current until welding occurs, with consequent operation of the trip 48. Welding normally takes some nineteen to thirty-one seconds. The time limit device 49 operates after some 34 seconds if the trip 48 has not previously operated. This is then repeated for the other five cables 1.

With the main source 33 off and the argon supply 8 (FIGURE 1) still on, the six cables 1 are removed from the enclosure 2 and a further six inserted. Operation on this next six can start as soon as the pressure has again fallen to about 5 mm. mercury.

The method described above is readily performed automatically under the control of a program which controls the necessary timing and switching.

We claim:

1. A method of sealing the end of a thermocouple cable having a tubular metal casing surrounding thermocouple wires, comprising subjecting the casing to a plasma arc welding process, applying a potential to at least one of the thermocouple wires to cause an electric current to flow in a loop including said wire and the plasma, and stopping the heating process when said current ceases to flow.

2. A thermocouple having a tubular metal casing with a sealed end closure made in accordance with the method of claim 1.

3. Apparatus for sealing the ends of thermocouple cables having a tubular metal casing surrounding thermocouple wires, comprising an enclosure wherein a thermocouple cable to be sealed is arranged to be mounted, means to maintain an inert atmosphere within said enclosure, a plasma generator mounted within said enclosure, means to control the plasma generator whereby the casing of said thermocouple cable is subjected to a plasma arc heating process, means to apply a potential to at least one of the thermocouple wires of said thermocouple cable to cause an electric current to flow in a loop including said wire and said plasma, means to sense the flow of said current, and means to stop said heating process when said current ceases to flow.

4. Apparatus in accordance with claim 3 further comprising means to stop said heating process after a predetermined time even if said current is still flowing.

5. Apparatus in accordance with claim 4 wherein said means to maintain an inert atmosphere within said enclosure comprises means to admit an inert gas to said enclosure, and a pump to maintain the gas pressure in said enclosure below atmospheric pressure.

6. Apparatus in accordance with claim 5 wherein said pump is connected to said enclosure by way of a buffer volume which exceeds the volume of said enclosure.

7. Apparatus in accordance with claim 6 wherein said inert gas is argon.

8. A thermocouple having a tubular metal casing with a sealed end closure made using apparatus in accordance with claim 3.

References Cited

UNITED STATES PATENTS

| 3,314,129 | 4/1967 | Pugh et al. | 219—121 XR |
| 3,346,717 | 10/1967 | Pugh et al. | 219—121 |

JOSEPH V. TRUHE, *Primary Examiner.*

U.S. Cl. X.R.

29—155.5